United States Patent [19]
Torii

[11] Patent Number: 5,982,430
[45] Date of Patent: Nov. 9, 1999

[54] AUTO FOCUS APPARATUS

[75] Inventor: Reiko Torii, Tokyo, Japan

[73] Assignee: Sony Corporation, Tokyo, Japan

[21] Appl. No.: 08/063,665

[22] Filed: May 20, 1993

[30] Foreign Application Priority Data

May 29, 1992 [JP] Japan ................................. 4-138993

[51] Int. Cl.$^6$ ................................................ H04N 5/232
[52] U.S. Cl. ........................ 348/356; 348/349; 348/353; 348/354
[58] Field of Search .................................. 348/354, 345, 348/355, 356, 361, 362, 224, 305, 352, 353, 349; 354/402; H04N 5/232

[56] References Cited

U.S. PATENT DOCUMENTS

| | | | |
|---|---|---|---|
| 4,603,355 | 7/1986 | Yamada et al. | 348/305 |
| 4,967,279 | 10/1990 | Murashima | 348/356 |
| 5,093,716 | 3/1992 | Kondo et al. | 348/224 |
| 5,107,337 | 4/1992 | Ueda et al. | 348/353 |
| 5,115,262 | 5/1992 | Komiya | 354/402 |
| 5,126,849 | 6/1992 | Senuma et al. | 358/227 |
| 5,204,749 | 4/1993 | Toyama et al. | 348/352 |

FOREIGN PATENT DOCUMENTS

| | | | |
|---|---|---|---|
| 0 318 278 | 5/1989 | European Pat. Off. | H04N 5/232 |
| 0 398 368 | 11/1990 | European Pat. Off. | H04N 5/232 |
| 0 446 647 | 9/1991 | European Pat. Off. | H04N 5/232 |
| 3132172 | 5/1991 | Japan | H04N 5/232 |

*Primary Examiner*—Wendy Garber
*Assistant Examiner*—Andrew B. Christensen
*Attorney, Agent, or Firm*—Frommer Lawrence & Haug, LLP; William S. Frommer

[57] ABSTRACT

An apparatus for generating an auto-focus measurement value for use in performing an auto-focus operation on the basis of contrast components in a video signal. The apparatus includes a line peak circuit which sequentially receives lines of the video signal and generates therefrom a sequence of maximum values of the contrast components of each of the lines. An averaging circuit calculates a rolling average of the line maximum values to form average values. A peak hold circuit outputs a maximum value of the average values as the auto-focus measurement value. The resulting auto-focus measurement value is not greatly affected either by noise or by moving objects within the image represented by the video signal.

13 Claims, 10 Drawing Sheets

All Integration System

FIG. 3B (PRIOR ART)

H. Line Peak Hold System

FIG. 3C (PRIOR ART)

V. Peak Hold System

AUTO FOCUS APPARATUS

BACKGROUND OF THE INVENTION

1. Field of the Invention

This invention relates to an auto-focus apparatus of the type in which an auto-focus measurement value is obtained from contrast components of a video signal.

2. Description of the Prior Art

Figure 1:
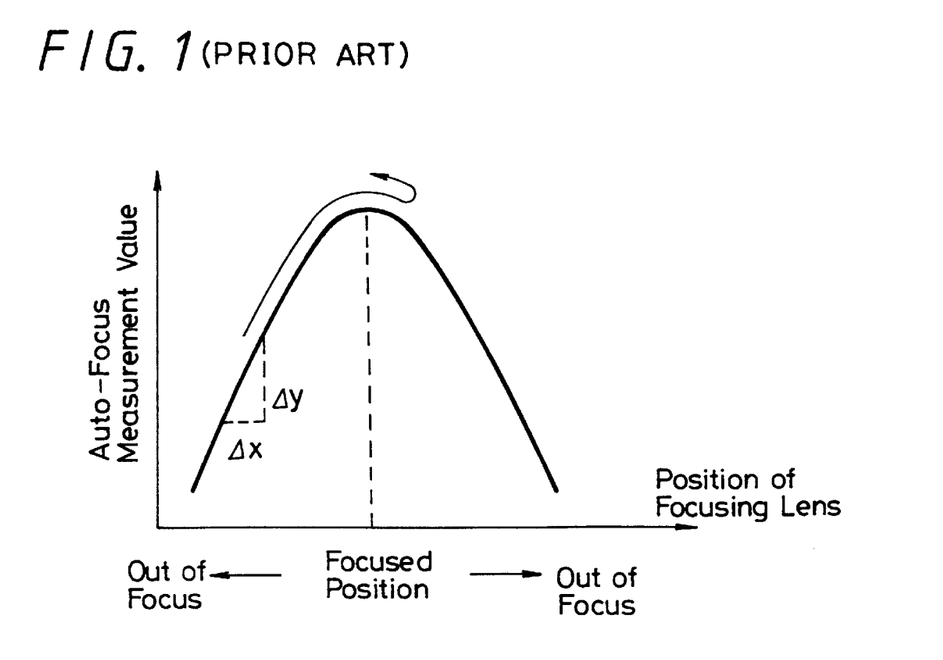
FIG. 1 is a diagram that shows the relationship between the position of a focusing lens and an auto-focus measurement value.

In a conventional auto-focus apparatus that is part of an image processing system, an auto-focus operation is carried out by adjusting a focusing lens so that an auto-focus measurement value obtained from contrast components of a video signal is maximized. This is based on the concept that proper focus is achieved when the high frequency components of the video signal are at a maximum. More particularly, as shown in FIG. 1, the direction and speed of adjustment are controlled on the basis of the sign and magnitude of a change $\Delta y$ in the auto-focus measurement value which results when the focusing lens is adjusted by a very small distance $\Delta x$.

Figure 2:
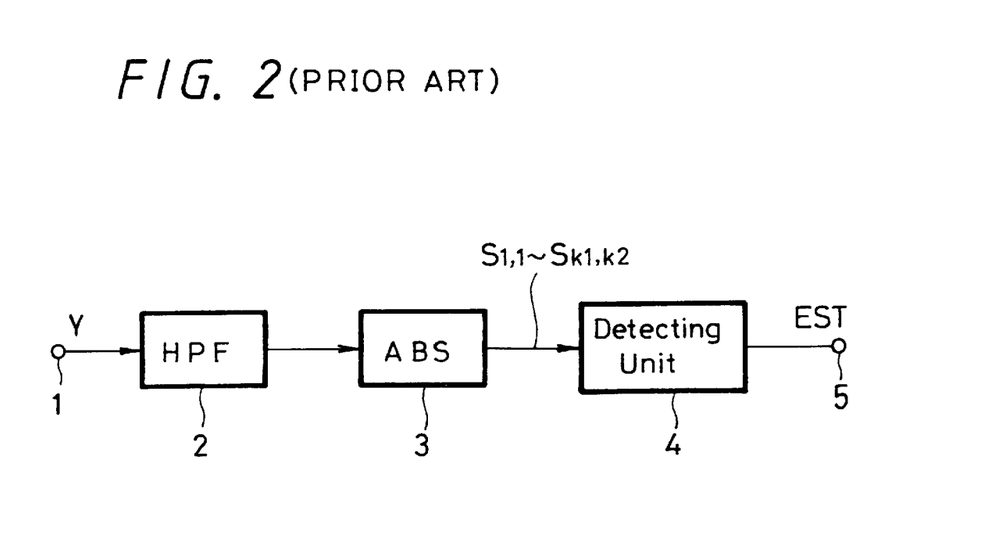
FIG. 2 is a block diagram of a conventional circuit for generating an auto-focus measurement value.

FIG. 2 shows a conventional circuit for generating an auto-focus measurement value. As shown in FIG. 2, a digital video signal Y is received at an input terminal 1 and is band-limited by a high-pass filter (HPF) 2. The band-limited signal output from HPF 2 is converted into an absolute value signal representative of contrast components of the video signal by an absolute value (ABS) circuit 3. The signal output from the ABS circuit 3 is supplied to a detecting unit 4 which generates an auto-focus measurement value EST on the basis of the absolute value signal according to one of various conventional approaches which will be described below. The resulting auto-focus measurement value EST is then output from an output terminal 5.

In describing the ways in which the auto-focus measurement value EST may be obtained according to the above-mentioned conventional approaches, $S_{1,1}$ - - - $S_{1,k2}$; $S_{2,1}$ - - - $S_{2,k2}$; . . . ; $S_{k1,1}$ - - - $S_{k1,k2}$ will represent absolute value (contrast component) signals output from ABS circuit 3 in response to a frame (hereinafter referred to as the "range finder frame") that is part of a field or frame of the video signal from which the auto-focus measurement value EST is to be obtained.

Figure 3A:
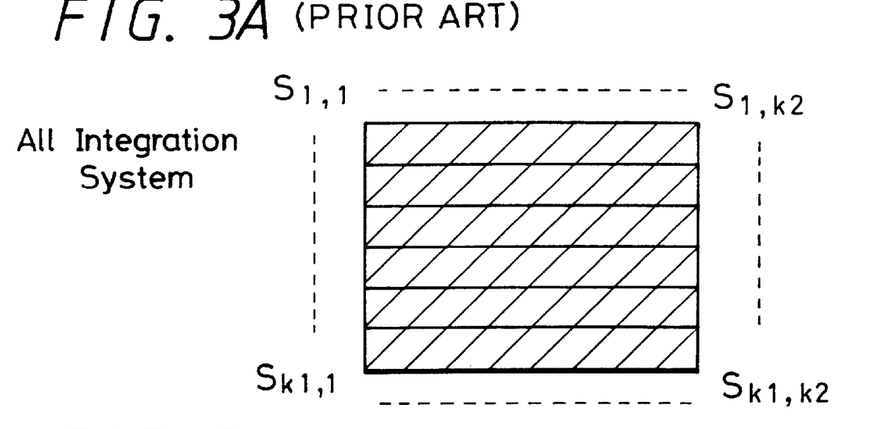
FIGS. 3A–3C are diagrams used for explaining various types of detecting units used in conventional auto-focus measurement value generating circuits.

A conventional approach known as an "integration system" will first be described. According to this system, as shown in the following equation (1), all of the signals $S_{1,1}$ through $S_{k1,k2}$ are added in the detecting unit 4 and the resulting sum is provided as the auto-focus measurement value EST (see FIG. 3A).

$$EST = \sum_{i=1}^{k1} \sum_{j=1}^{k2} S_{i,j} \qquad (1)$$

Figure 3B:
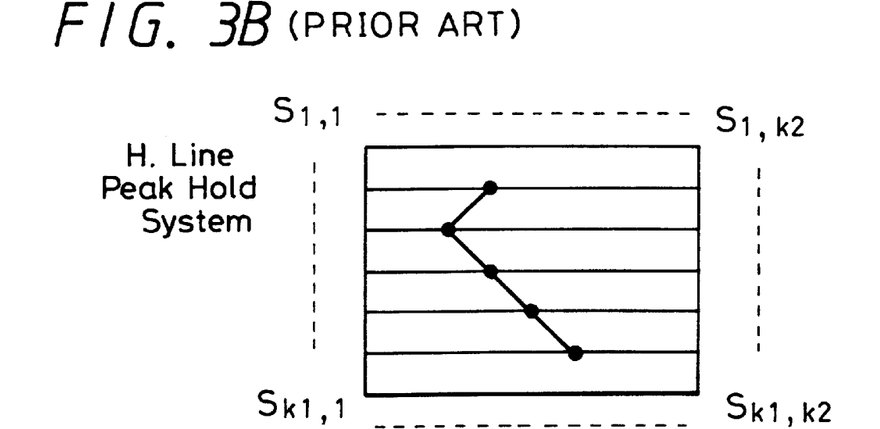

Next a so-called horizontal line (H line) peak hold system will be described. According to this system, as shown in the following equation (2), there is generated a maximum value of each line of signals ($S_{1,1}$ - - - $S_{1,k2}$), ($S_{2,1}$ - - - $S_{2,k2}$), . . . , ($S_{k1,1}$ - - - $S_{k1,k2}$). The line maximum values are summed and the result is provided as the auto-focus measurement value EST (see FIG. 3B).

$$EST = \sum_{i=1}^{k1} \left( \max_{j=1}^{k2} (S_{i,j}) \right) \qquad (2)$$

Figure 3C:
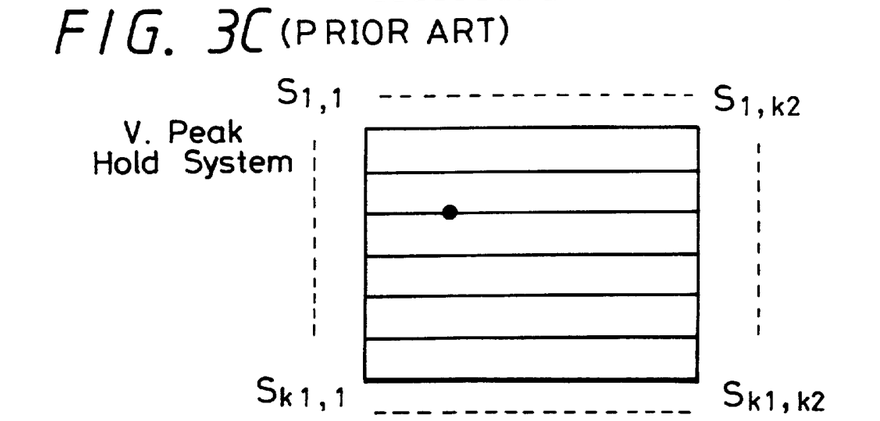

A third conventional system, known as the vertical peak (V peak) hold system will next be described. According to this system, as shown in the following equation (3), the maximum of all of the signals $S_{1,1}$ - - - $S_{k1,k2}$ is detected by detecting unit 4 and provided as the auto-focus measurement value EST (see FIG. 3C).

$$EST = \max_{i=1}^{k1} \left( \max_{j=1}^{k2} (S_{i,j}) \right) \qquad (3)$$

All of these conventional systems suffer from disadvantages. An auto-focus measurement value obtained according to the integration or H line peak hold system is not greatly affected by noise but tends to be affected by a moving object within the scene represented by the video signal. Conversely, an auto-focus measurement value obtained according to the V peak hold system is not greatly affected by moving objects within the scene of the video signal, but tends to be affected by noise.

Turning to another aspect of conventional approaches for generating an auto-focus measurement value, reference is again made to the curve shown in FIG. 1, which represents changes in the auto-focus measurement value in response to changes in position of the focusing lens. In order to perform a satisfactory auto-focus operation, the base of this curve must be inclined. For that purpose, HPF 2 (FIG. 2) is required to have a low cut-off frequency so that its output signal contains as many components as possible other than DC.

Figure 4A:
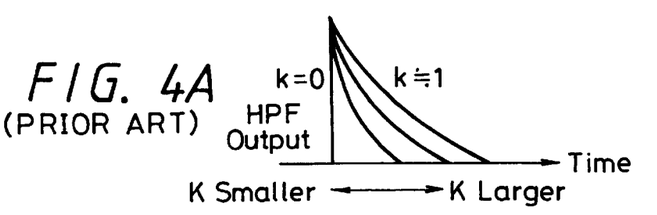
FIGS. 4A and 4B are, respectively, diagrams showing a step response and a frequency characteristic of a high-pass filter used in conventional auto-focus measurement value generating circuits.
Figure 4B:
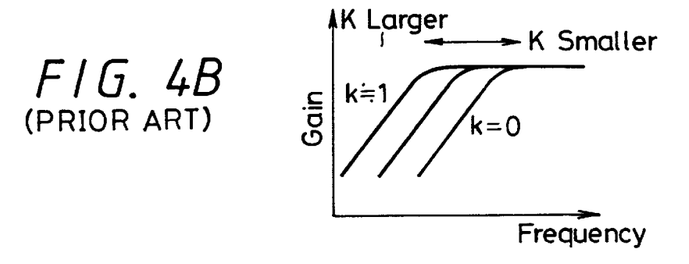

However, the lower the cut-off frequency of HPF 2, the longer the time period during which a signal change at a certain point in time continues to affect the output of HPF 2. FIGS. 4A and 4B respectively show the step response and the frequency characteristic of embodiments of HPF 2 depending on variations in its transfer characteristic (1-D)/(1-kD). It will be seen that as the parameter k is increased, the cut-off frequency is decreased, but the period of response to a signal step increases.

Figure 5A:
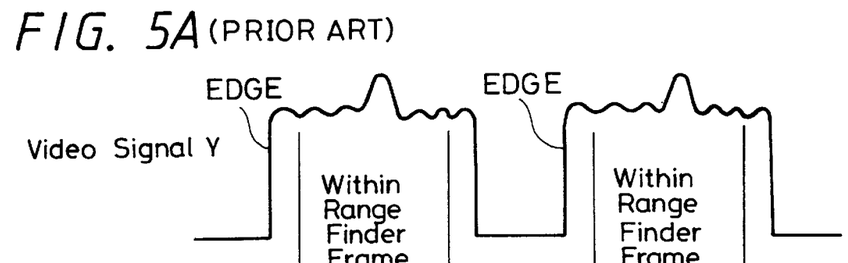
FIGS. 5A and 5B are diagrams that illustrate the effect upon an output of a high pass filter by a leading edge produced at the end of a horizontal blanking period.
Figure 5B:
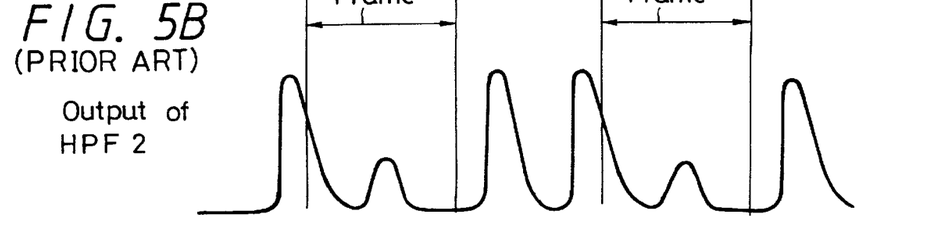

Other problems with conventional auto-focus systems arise when an edge of an object is present near the left side of the range finder frame, or when the leading edge after a horizontal blanking interval (i.e. the black level) affects the output of HPF 2. FIG. 5A shows the input video signal Y and FIG. 5B shows the corresponding output signal from HPF 2. As seen from FIGS. 5A and 5B, the output signal of the HPF 2 during the period corresponding to the range finder frame is affected by the leading edge EDGE which follows the horizontal blanking period.

Another disadvantage of conventional auto-focus systems will be explained with reference to the flow chart shown in FIG. 6, which illustrates a process according to the prior art for determining whether an auto-focus operation should be performed.

It should be understood that the automatic focus operations described herein are conducted with respect to real-time moving images, not still pictures. Accordingly, when a change occurs in the auto-focus measurement value, it is necessary to distinguish between two different cases: (1) An object within the scene has moved but the scene as a whole is unchanged; and (2) the entire scene has changed. In the second case, a complete auto focus operation must be performed; in the first case only a fine adjustment should be made, for otherwise the picture would become unstable.

Figure 6:
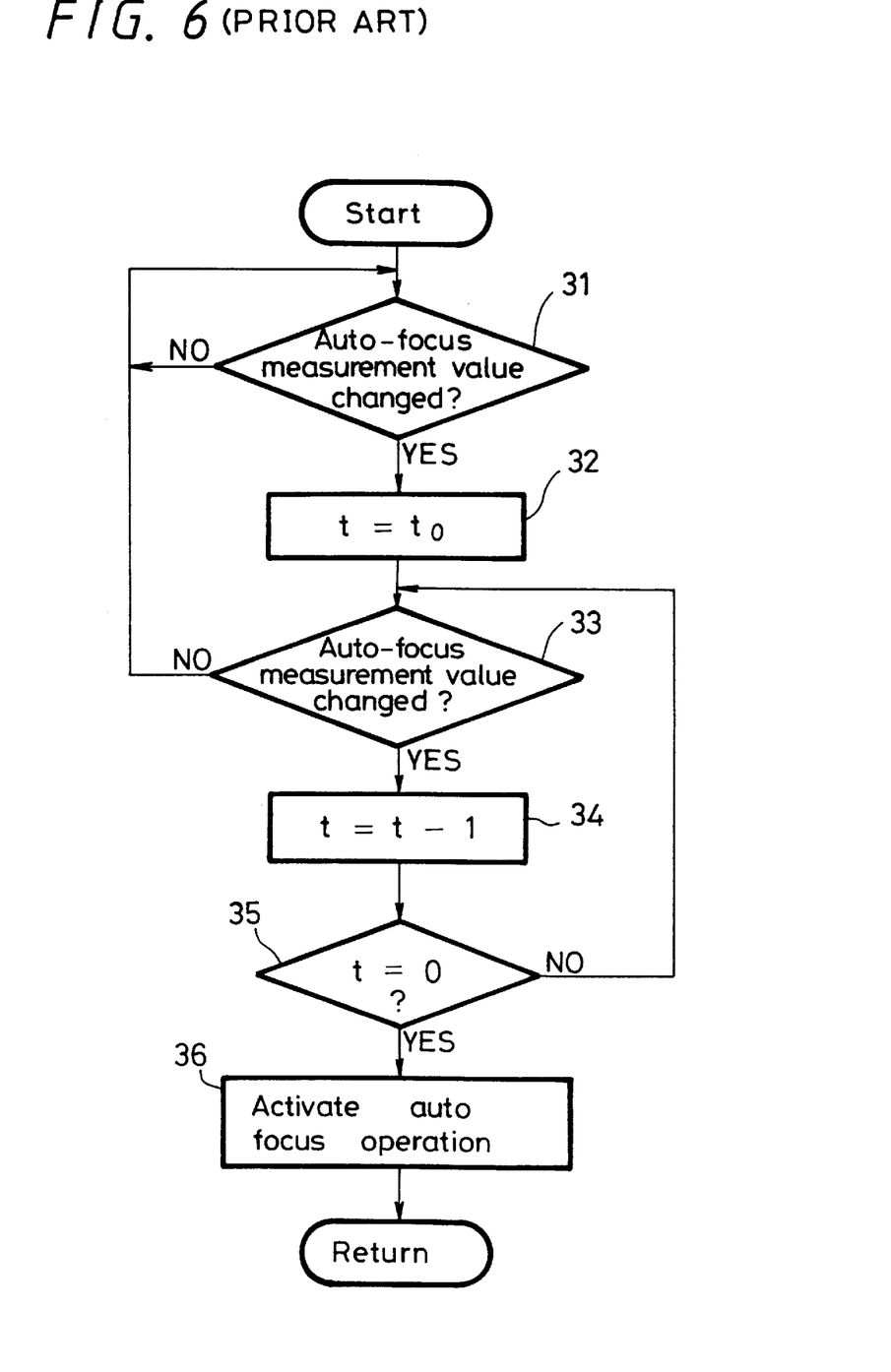
FIG. 6 is a flow chart that illustrates a conventional procedure for determining whether to perform an auto-focus operation.

At the beginning of the routine shown in FIG. 6, it is determined, at step 31, whether or not the auto-focus measurement value has changed from the value for the preceding field. If so, then the routine proceeds to step 32 in which a field count t is set to an initial value t0 (for example, t0=20).

Following step 32 is step 33, at which it is determined whether the auto-focus measurement value for the next field has changed. If not, the routine returns to step 31. Otherwise, following step 33 is step 34, at which the field counter t is decremented. After step 34 is step 35, at which it is determined whether the field counter t has been decremented to 0. If not, then the routine returns to step 33. Otherwise, i.e. if the auto-focus measurement value has changed for a consecutive number of fields equal to t0, then it is determined that an auto-focus operation should be performed (step 36).

It is a disadvantage of this prior art decision making process that the start of the auto-focus operation does not occur for a relatively long time, e.g., 20 fields, after a change of scene. However, if the number of fields t0 is reduced, then it often occurs that motion of an object within the scene is mistaken for a change of scene, resulting in such problems as an unstable picture.

OBJECTS AND SUMMARY OF THE INVENTION

Accordingly, it is an object of the present invention to provide an improved auto-focus apparatus in which the aforesaid shortcomings and disadvantages of prior art systems can be eliminated.

More specifically, it is an object of the present invention to provide an auto-focus apparatus in which the auto-focus measurement value is not greatly affected either by noise or by moving objects within the scene represented by the video signal.

It is another object of the present invention to provide an auto-focus apparatus in which the auto-focus measurement value is not affected by the spurious leading edge following a horizontal blanking period.

It is a further object of the present invention to provide an auto-focus apparatus in which it is determined rapidly and reliably when an auto-focus operation should be performed.

In accordance with an aspect of the present invention, an apparatus for generating an auto-focus measurement value to be used in performing an auto-focus operation on the basis of contrast components of a video signal includes a line peak circuit for sequentially receiving lines of the video signal and generating respective maximum values of contrast components of the received lines of the video signal. The apparatus also includes an averaging circuit for sequentially averaging the maximum values generated by the line peak circuit over predetermined groups of the lines of the video signal to form a plurality of average values and a peak hold circuit for outputting as the auto-focus measurement value a maximum value of the plurality of average values formed by the averaging circuit.

With the apparatus according to this aspect of the present invention, because the auto-focus measurement value is obtained in a manner similar to the V peak hold system, a moving object within the scene represented by the video signal does not greatly affect the resulting auto-focus measurement value. Moreover, since the respective line maximum values are sequentially averaged over predetermined groups of the lines, and the maximum value of the resulting average values is used as the auto-focus measurement value, the influence of noise on that value is reduced.

According to another aspect of the invention, an apparatus for generating an auto-focus measurement value to be used in performing an auto-focus operation on the basis of contrast components in a video signal includes a line peak circuit for sequentially receiving lines of the video signal and generating respective maximum values of contrast components of the received lines of the video signal. The apparatus also includes a low-pass filter for receiving and low-pass filtering the maximum values generated by the line peak circuit to produce a filtered output signal and a peak hold circuit for outputting as the auto-focus measurement value a maximum value of the filtered output signal produced by the low-pass filter.

Further, according to the latter aspect of the invention the low-pass filtering of the line maximum values reduces the effect of noise upon the resulting auto-focus measurement value, while at the same time the system remains similar to the V peak hold system so that the measurement value is not greatly affected by a moving object within the scene.

According to still another aspect of the invention, an apparatus for performing an automatic focus operation on the basis of contrast components of a video signal includes a circuit for detecting maximum values of contrast components of respective lines of the video signal, a circuit for averaging the detected maximum values corresponding to the lines of the video signal to form a first auto-focus measurement value, a circuit for detecting a maximum value of contrast components with respect to a field of the video signal and for outputting said detected maximum value for said field as a second auto-focus measurement value, and a circuit for actuating an auto-focus operation in response to a change in both the first and second auto-focus measurement values.

According to further aspects of the invention, the apparatus also includes a circuit for replacing a horizontal period of the video signal with a signal that has a level that is substantially equal to a starting portion of a line within a range finder frame of the video signal and a circuit for replacing a vertical blanking period of the video signal with a signal that has a level that is substantially equal to a starting portion of a line within a range finder frame of the video signal.

Because the decision on whether to begin an auto-focus operation is based on changes in two auto-focus measurement values, one of which is the average of line maximum values and the other of which is a maximum field value, the decision can be made more accurately and rapidly.

Moreover, because the synchronizing portion of the video signal is replaced with a signal having a level that is substantially equal to the starting portion of the video signal, a high pass filter with a lower cut-off frequency can be used so as to widen the frequency band, while reducing the effect of the leading edge at the end of the horizontal blanking period and also reducing the effect of the vertical blanking period.

The above, and other objects, features and advantages of the present invention will be apparent from the following detailed description thereof which is to be read in connection with the accompanying drawings.

DETAILED DESCRIPTION OF THE PREFERRED EMBODIMENTS

Embodiments of the present invention will now be described with reference to the drawings. In each of the embodiments, there is provided an auto-focus apparatus which generates an auto-focus measurement value on the basis of contrast components of a video signal.

Figure 7:
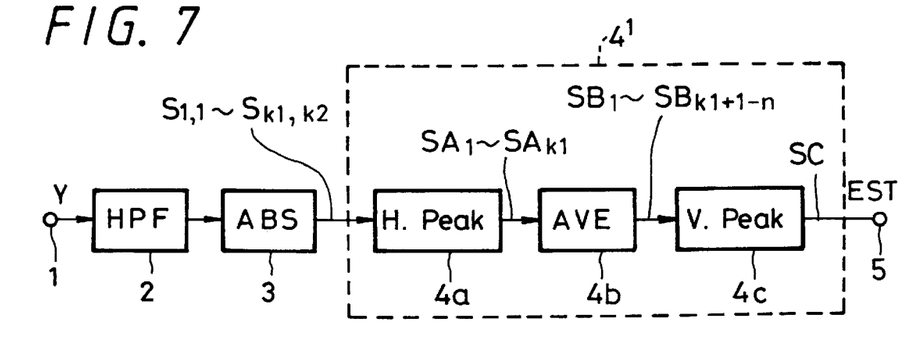
FIG. 7 is a block diagram of an auto-focus measurement value generating circuit according to a first embodiment of the present invention.

FIG. 7 is a block diagram of an auto-focus measurement value generating circuit according to a first embodiment of the invention. In FIG. 7, elements corresponding to those of FIG. 2 are marked with the same reference numerals and therefore need not be described in detail.

In the embodiment of FIG. 7, the detecting unit 4' that is connected to the output of the ABS circuit 3 includes a horizontal line peak hold circuit 4a, an averaging circuit 4b and a vertical peak hold circuit 4c.

Figure 8A:
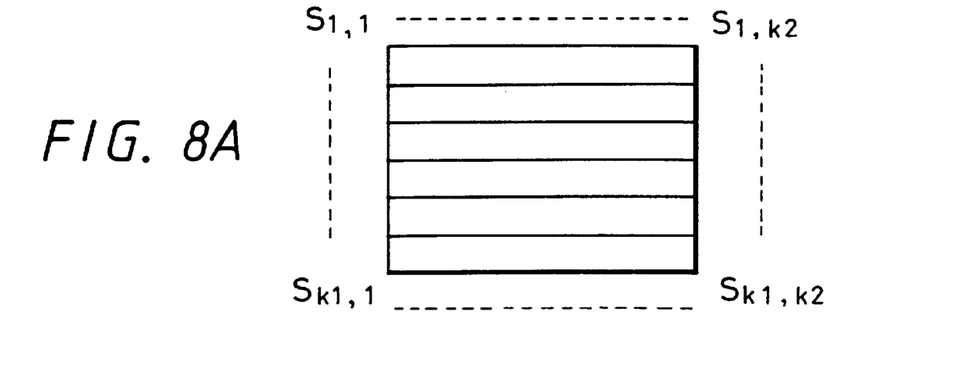
FIGS. 8A–8D are diagrams used for explaining operation of a detecting unit that is part of the auto-focus measurement value generating circuit of FIG. 7.
Figure 8B:
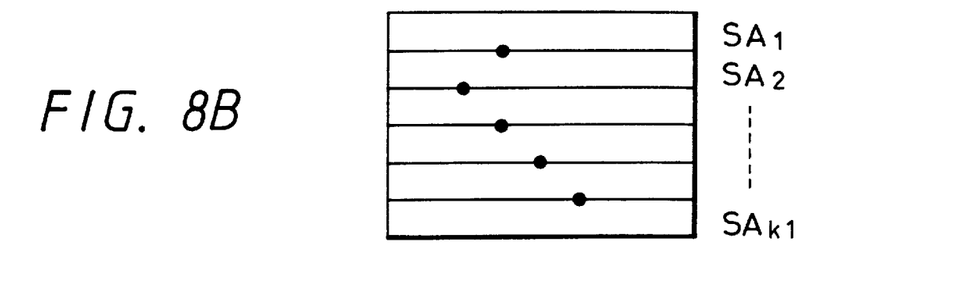

ABS circuit 3 generates lines of signals $(S_{1,1} - - - S_{1,k2})$ $(S_{2,1} - - - S_{2,k2})$, . . . , $(S_{k1,1} - - - S_{k1,k2})$ in response to the portion of the video signal within the range finder frame. In response to these lines of signals, the horizontal line peak hold circuit 4a generates maximum values $SA_1, SA_2, \ldots, SA_{k1}$ (see FIGS. 8A, 8B) according to the following equation (4):

$$SA_1 = \max(S_{1,1}, S_{1,2}, \ldots, S_{1,k2}) \quad (4)$$

-continued
$$SA_2 = \max(S_{2,1}, S_{2,2}, \ldots, S_{2,k2})$$
$$\vdots$$
$$SA_{k1} = \max(S_{k1,1}, S_{k1,2}, \ldots, S_{k1,k2})$$

Figure 8C:
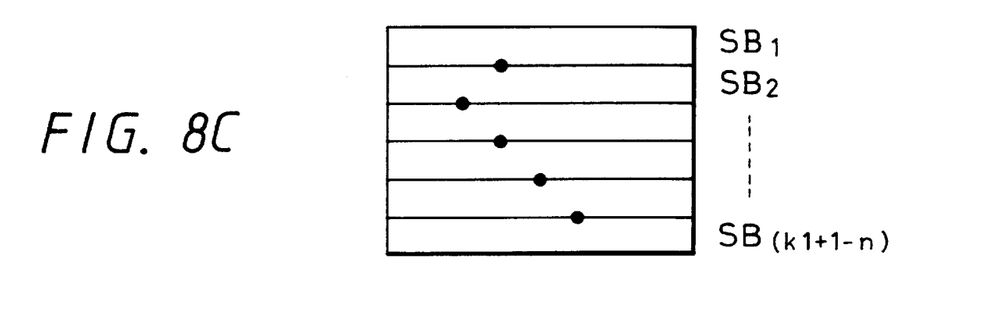

The averaging circuit 4b provides sequential rolling averages of the maximum values $SA_1, SA_2, \ldots, SA_{k1}$ output from the horizontal line peak hold circuit 4a, with groups of n lines being averaged to produce a plurality of average values $SB_1, SB_2, \ldots, SB_{(k1+1-n)}$, as shown in FIG. 8C. The number of lines n in each group that is averaged may be four or five, for example. The formulas by which the rolling average values $SB_1, SB_2, \ldots, SB_{(k1+1-n)}$ are obtained are shown in the following equation (5):

$$SB_1 = SA_1 + SA_2 + \cdots + SA_n \quad (5)$$
$$SB_2 = SA_2 + SA_3 + \cdots + SA_{(n+1)}$$
$$\vdots$$
$$SB_{(k1+1-n)} = SA_{(k1+1-n)} + \cdots + SA_{k1}$$

(Although not shown in equation (5) it will be recognized that a factor such as 1/n may be applied to each of the values $SB_1, SB_2, \ldots, SB_{(k1+1-n)}$.)

Figure 8D:
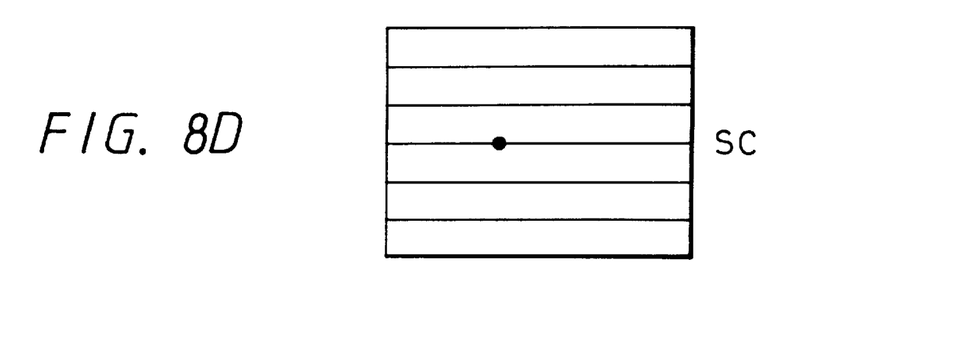

The peak hold circuit 4c generates a maximum value SC (FIG. 8D) on the basis of the rolling average values $SB_1, SB_2, \ldots SB_{(k1+1-n)}$ provided by the averaging circuit 4b. The maximum value SC is obtained in accordance with the following equation (6):

$$SC = \max(SB_1, SB_2, \ldots, SB_{(k1+1-n)}) \quad (6)$$

According to the embodiment of FIG. 7, the maximum value SC provided by the peak hold circuit 4c is output from detecting unit 4' and provided at the output terminal 5 as the auto-focus measurement value EST. The auto-focus measurement value EST generated by the embodiment of FIG. 7 is inherently similar to the value provided in the V peak hold system described above with reference to FIG. 3C and equation (3). Accordingly, the auto-focus measurement value generated by the circuit of FIG. 7 is not greatly affected by motion of an object within the scene represented by the video signal.

Moreover, averaging circuit 4b, as noted above, provides rolling averages $SB_1, SB_2, \ldots, SB_{(k1+1-n)}$ on the basis of the line maximum values $SA_1, SA_2, \ldots, SA_{k1}$, and the auto-focus measurement value EST is established as the maximum value SC of the average values $SB_1, SB_2, \ldots, SB_{(k1+1-n)}$. Because of the averaging performed at the averaging circuit 4b in the embodiment of FIG. 7, the influence of noise upon the auto-focus measurement value EST is reduced as compared with the V peak hold system. In other words, if the maximum value of a given line is large, and the maximum values of the immediately preceding and succeeding lines are relatively small, then it is likely that the large line maximum is the result of noise. Because of the averaging carried out in the circuit of FIG. 7, the effect of that noise is reduced.

Although the averaging circuit 4b as described above provides an n line rolling average shifted one line at a time, the present invention is not limited to such averaging. For example, the n line rolling average may be shifted by two lines or more. As another alternative, it is possible for averaging circuit 4b to average groups of lines that do not overlap.

Figure 9:
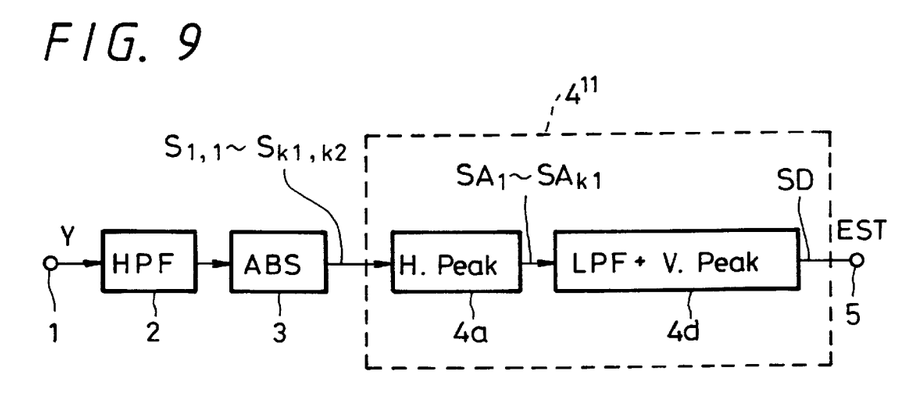
FIG. 9 is block diagram of an auto-focus measurement value generating circuit according to a second embodiment of the invention.

FIG. 9 is a block diagram of an auto-focus measurement value generating circuit in accordance with a second embodiment of the present invention. In FIG. 9, elements corresponding to those of FIG. 2 are again marked with the same reference numerals and need not be described in detail.

In the embodiment of FIG. 9, the detecting circuit 4" that is connected to the output of the ABS circuit 3 includes a horizontal line peak hold circuit 4a and a processing circuit 4d. The horizontal line peak hold circuit 4a is the same as that described in connection with the embodiment of FIG. 7, so that, as before, the lines of signals $(S_{1,1} - - - S_{1,k})$, $(S_{2,1} - - - S_{2,k2})$, ..., $(S_{k1,1} - - - S_{k1,2})$ provided by ABS circuit 3 on the basis of the contrast components in a range finder frame of a field of the video signal are provided to the horizontal line peak hold circuit 4a, which generates therefrom line maximum values $SA_1$, $SA_2$, ..., $SA_{k1}$ (FIGS. 8A, 8B).

The processing circuit 4d performs low-pass filtering on the maximum values $SA_1$, $SA_2$, ..., $SA_{k1}$. The maximum value SD of the resulting filtered line maximum signals is output by the detecting unit 4" and provided at output terminal 5 as the auto-focus measurement value EST.

Figure 10:
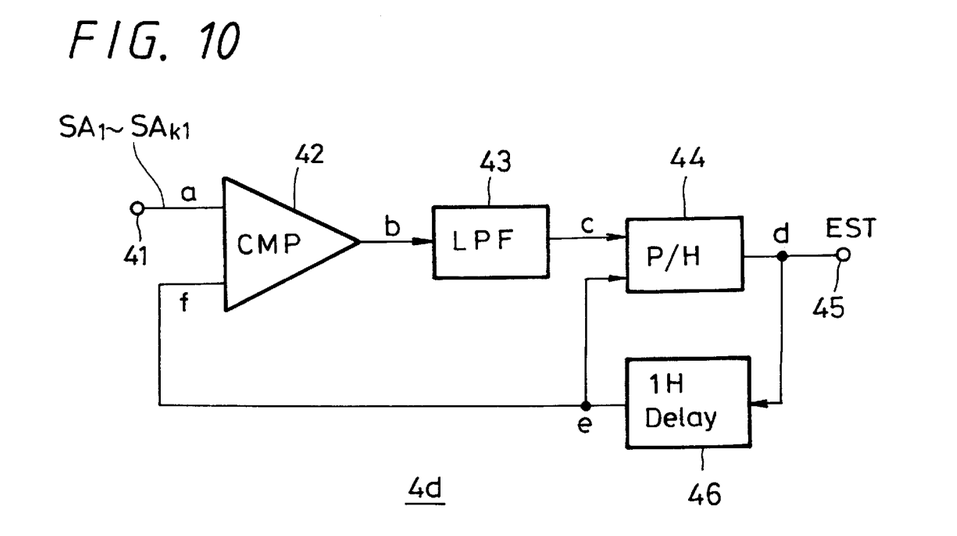
FIG. 10 is block diagram showing details of a processing circuit that is part of the auto-focus measurement value generating circuit of FIG. 9.

FIG. 10 is a block diagram showing details of the processing circuit 4d. As shown in FIG. 10, the maximum values $SA_1$, $SA_2$, ..., $SA_{k1}$ provided by horizontal line peak hold circuit 4a are sequentially provided via an input terminal 41 to a comparator (CMP) 42 as a comparison signal a at intervals of one horizontal line period. An output signal b from the comparator 42 is provided to a low-pass filter (LPF) 43 which provides low-pass filtering in the vertical direction. An output signal c from the low-pass filter 43 is provided to a peak hold circuit 44.

An output signal d from the peak hold circuit 44 is provided as the auto-focus measurement value EST via an output terminal 45 and also is provided to a 1 H (one horizontal period) delay circuit 46. The delayed output signal e from the 1 H delay circuit 6 is provided to comparator 42 as a reference signal f and also is supplied to the peak hold circuit 44.

In operation, the comparator 42 compares signals a and f and outputs the larger of the two. In other words, the output b of comparator 42 is as follows: b=max(a,f). The peak hold circuit 44 compares the signals c and e and outputs the larger so that its output signal d=max(c,e). The signal d is held in the peak hold circuit 44 as the auto-focus measurement value EST when all of the line maximum values $SA_1$, $SA_2$, ..., $SA_{k1}$ have been supplied to input terminal 41.

In the auto-focus measurement value generating circuit of FIG. 9, as described above, the auto-focus measurement value EST is inherently similar to the value provided by the conventional V peak hold system described previously with respect to FIG. 3C and equation (3). Therefore, the auto-focus measurement value EST provided by the circuit of FIG. 9 is not greatly affected by a moving object within the scene represented by the video signal. Moreover, the effect of noise upon the auto-focus measurement value is reduced because of the low-pass filtering that is applied to the line maximum values $SA_1$, $SA_2$, ..., $SA_{k1}$ before the field maximum value SD is obtained. In other words, if the maximum value of a given line is large while the respective maximum values of the immediately preceding and succeeding lines are relatively small, then it is likely that the relatively large line maximum is the result of noise. The low-pass filtering carried out in the embodiment of FIG. 9 reduces the effect of such noise upon the auto-focus measurement value.

Figure 11:
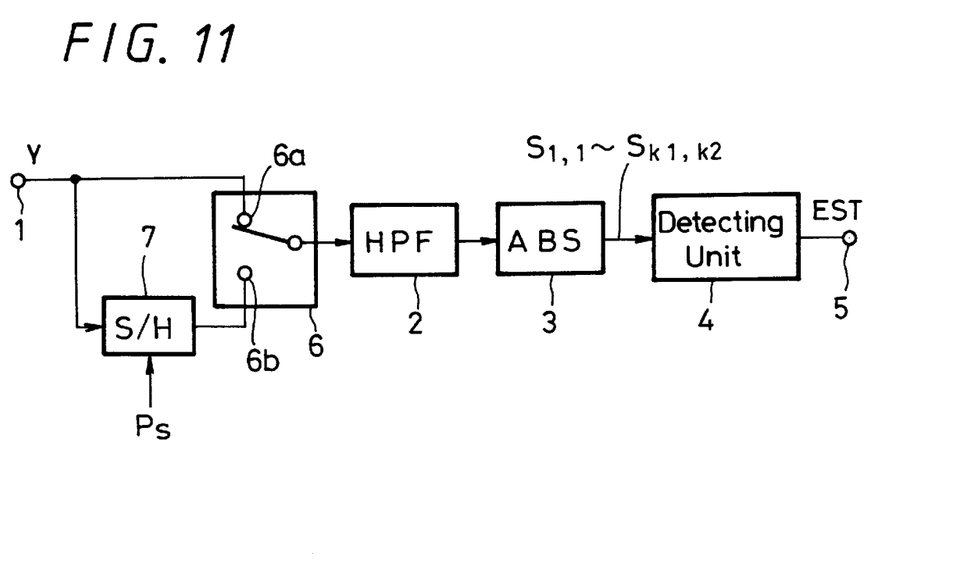
FIG. 11 is a block diagram of an auto-focus measurement value generating circuit according to a third embodiment of the invention.

FIG. 11 is a block diagram of an auto-focus measurement value generating circuit according to a third embodiment of the invention. In FIG. 11, elements corresponding to those of FIG. 2 are marked with the same reference numerals and therefore need not be described in detail.

Figure 12:
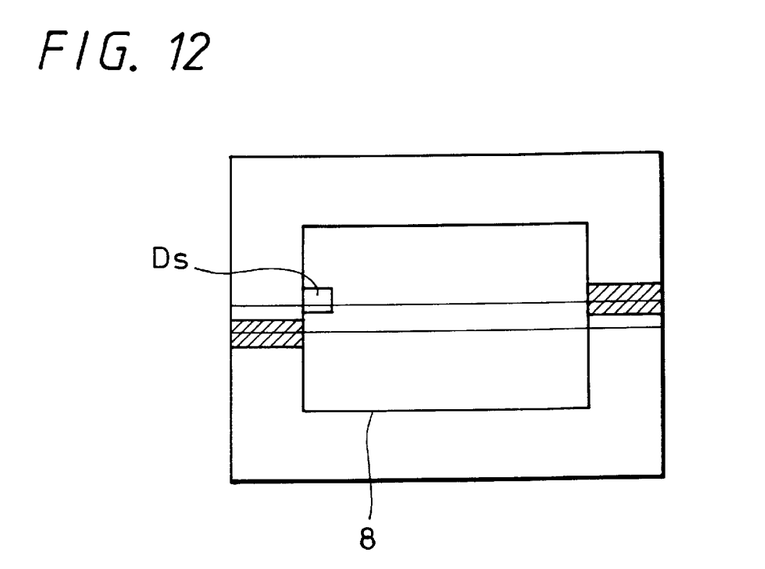
FIGS. 12–14 are diagrams for explaining operation of the auto-focus measurement value generating circuit of FIG. 11.

As shown in FIG. 11, the video signal Y received at the input terminal 1 is supplied directly to a fixed contact 6a of a change-over switch 6 and is also supplied to a sample and hold (S/H) circuit 7. A sampling pulse Ps is applied to the sample and hold circuit 7 at a time that coincides with the start of the portion of each line that is in a range finder frame 8 (FIG. 12). In response to the sampling pulse Ps, the video signal is sampled and a pixel signal level Ds is held in sample and hold circuit 7, where the pixel signal level Ds corresponds to the first pixel of the portion of the line within the range finder frame 8.

An output signal from the sample and hold circuit 7 is supplied to a fixed contact 6b of the change-over switch 6. The position of change-over switch 6 is controlled by a signal applied thereto from a control circuit which is not shown. The position of change-over switch 6 is controlled in such a manner that the fixed contact 6a is connected to an output terminal of switch 6 at times when the video signal Y represents the inside of the range finder frame 8, and the output signal of sample and hold circuit 7 is connected via fixed contact 6b to the output terminal of switch 6 at other times. The provision of control signals in this manner to switch 6 via the control circuit which is not shown is well within the capabilities of those having ordinary skill in the art, so that there is no need to show or further describe the control circuit. As shown in FIG. 11, the output of switch 6 is provided as an input to HPF 2. The balance of the auto-focus measurement value generating circuit of FIG. 11 may be, for example, the same as the corresponding portions of the circuit of FIG. 2. Alternatively, the detecting unit 4 of FIG. 11 may be like the detecting unit 4' of FIG. 7 or the detecting unit 4" of FIG. 9. As still another alternative, the two detecting units as described below in connection with FIG. 15 may take the place of the detecting unit 4 of FIG. 11.

Figure 12A:
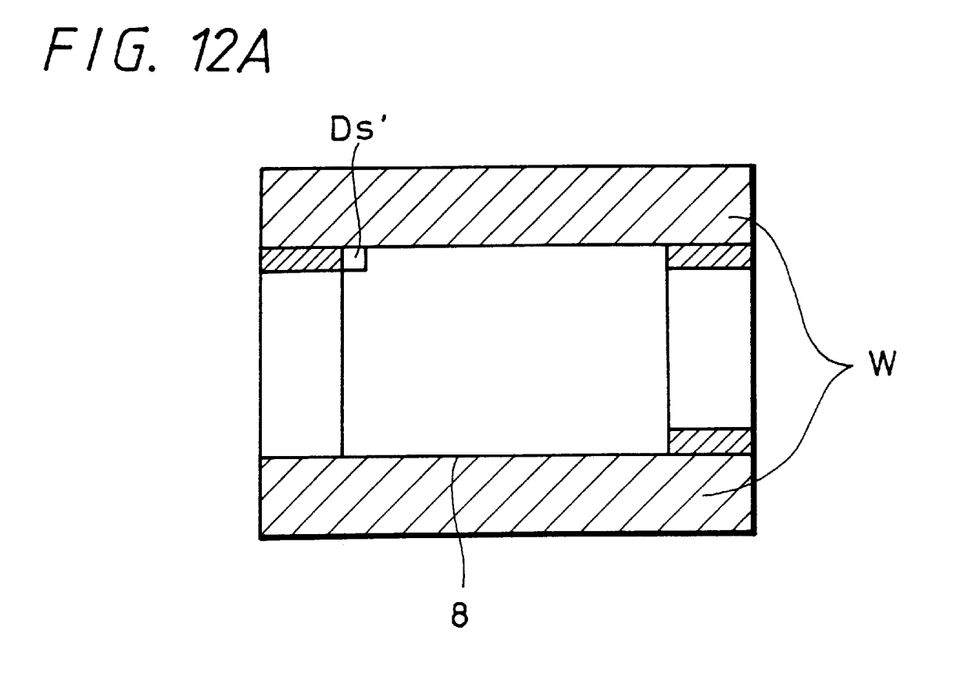

It will be appreciated that the portions of the video signal Y within range finder frame 8 are provided to HPF 2. On the other hand, at times when the video signal Y represents portions of the field outside of range finder frame 8, the pixel signal level Ds that had been sampled and held in sample and hold circuit 7 is provided to HPF2 in place of the video signal. Referring to FIG. 12, the shaded portions thereof represent times at which the pixel signal level Ds is provided to HPF 2 instead of the video signal Y. Because of line correlation, the level of the pixel signal Ds which represents the first pixel within the frame 8 of the preceding line is substantially equal to the level of the first pixel of the present line. It will be recognized that the signal level Ds replaces the horizontal blanking interval of a line of the video signal. Referring to FIG. 12A, shaded portions W thereof represent times at which a signal level Ds' is provided to HPF2 instead of the video signal Y. The signal level Ds' is substantially equal to the pixel signal level at the start of the first line within the range finder frame.

Those having skill in the art will recognize that sample and hold circuit 7 may receive a separate pulse Ps' to cause the level Ds' to be sampled and held, and that circuit 7 may include circuitry for separately and simultaneously holding the levels Ds and Ds' and for providing a selected one of the levels to the fixed contact 6b of switch 6 according to a control signal from the control circuit referred to above.

Figure 13:
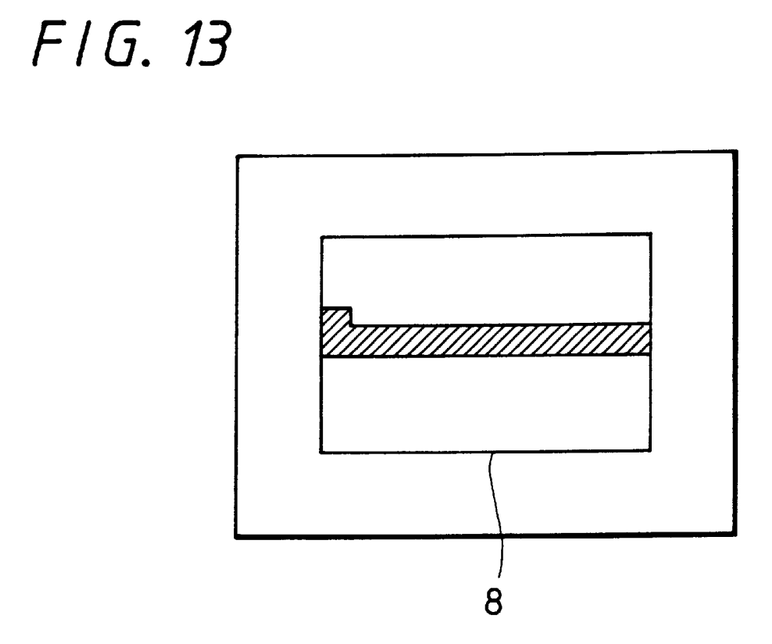

In the embodiment of FIG. 11, an edge in the form of the shaded portion of FIG. 13 is detected by HPF 2, but an edge of an object that is outside of the range finder frame 8, or the leading edge resulting from the end of the horizontal blanking period, will not be detected at HPF 2 and so will not affect the auto-focus measurement value EST output from the circuit of FIG. 11. As a result, the cut-off frequency of HPF2 can be reduced and a satisfactory auto-focus operation can be performed.

Figure 14:
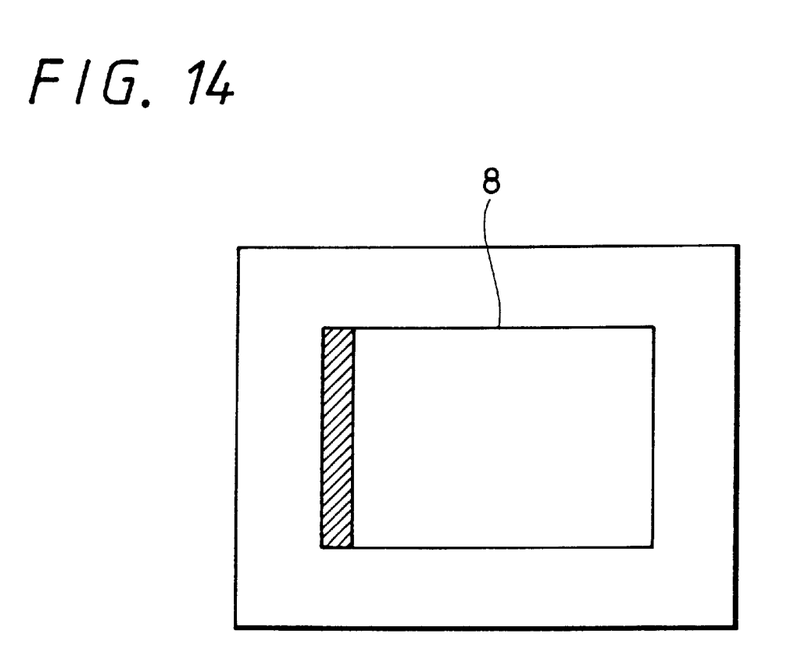

In addition, in the embodiment of FIG. 11 an edge that runs in the vertical direction, as shown by the shaded portion of FIG. 14, is also properly detected.

With replacement of the portion of the video signal Y that is outside of the range finder frame 8 with a stored value from within the range finder frame 8, a satisfactory auto-focus operation can be carried out even when the image represented by video signal Y is an object that is difficult to pick up, such as horizontal stripes or the like.

It should be noted that according to the embodiment of FIG. 11 as described up to this point, all of the video signal Y outside of the range finder frame 8 is replaced by the signal held in the sample and hold circuit 7. In other words, all of the vertical blanking intervals as well as the horizontal blanking intervals are replaced, as well as peripheral portions of the picture itself. However, the present invention is not limited thereto. For example, the control of the switch 6 and the application of the sampling pulse Ps can be carried out so that only the horizontal blanking interval is replaced by the signal output from the sample and hold circuit 7, thereby eliminating the undesirable effect upon the auto-focus measurement value by the leading edge that occurs at the end of the horizontal blanking interval. As another alternative, a delay element can be provided before or after the sample and hold circuit 7 so that the replacement signal provided instead of the portions outside of the range finder frame is at the level of a pixel from a prior field or frame.

Figure 15:
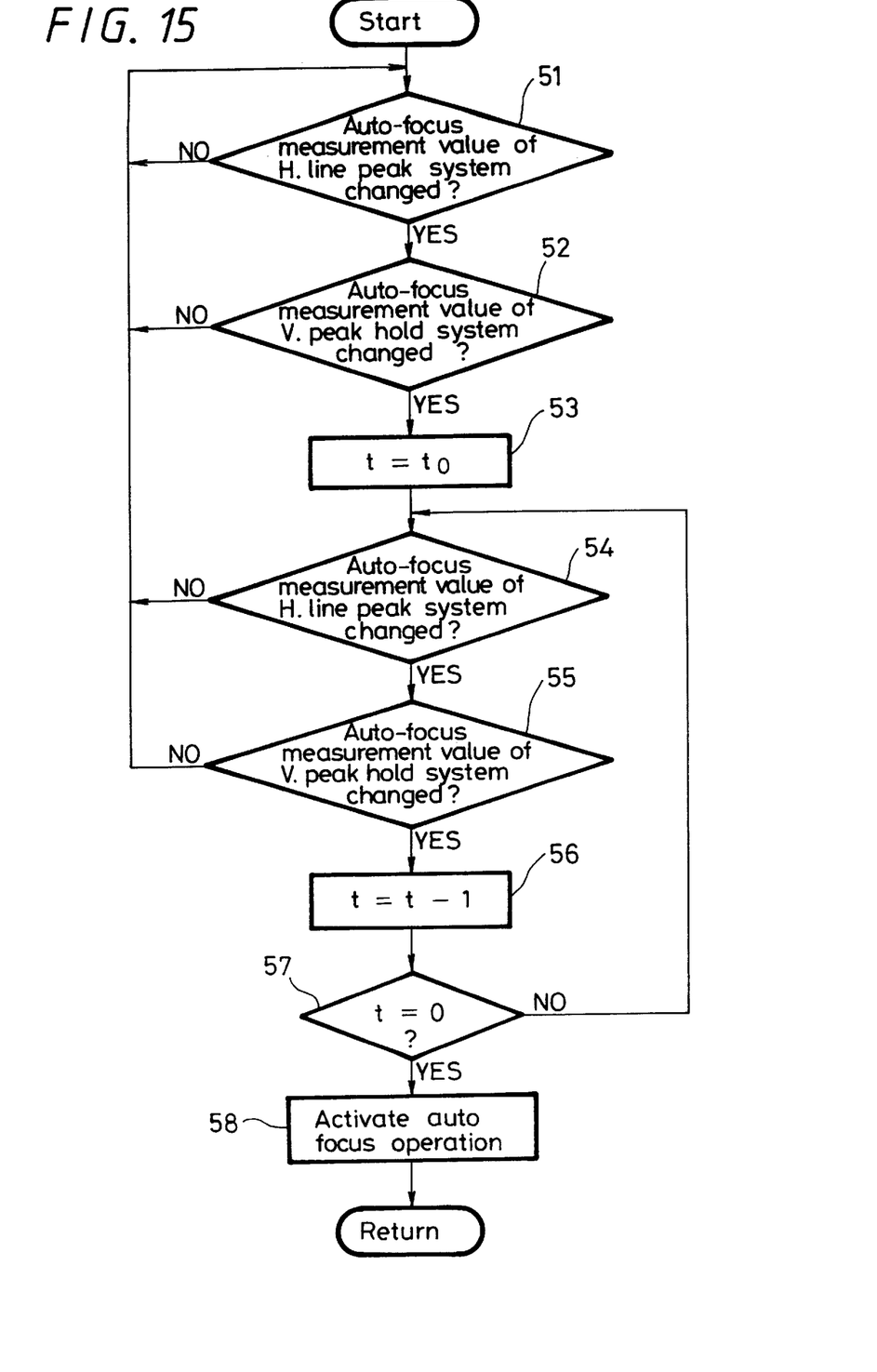
FIG. 15 is a flow chart of a procedure for determining when to perform an auto-focus operation in accordance with the present invention.

FIG. 15 is a flow chart of a procedure for determining, in accordance with the present invention, when an auto-focus operation should be performed. For the purposes of the procedure illustrated in FIG. 15, it should be understood that two auto-focus measurement values, ESTa and ESTb, are generated. For example, the first value ESTa may be generated as a sum or average of line maximum values according to the conventional H line peak hold system as previously described, and value ESTb may be generated according to the conventional V peak hold system as previously described.

Referring now to FIG. 15, at the beginning of the routine it is determined, at step 51, whether or not the auto-focus measurement value ESTa has changed. If not, the routine cycles back to the beginning. Otherwise, step 52 follows, at which it is determined whether the auto-focus measurement value ESTb has also changed. Again, if not, the routine returns to the beginning, i.e. to step 51. However, if both of the measurement values have changed, then step 53 follows, at which the field count t is set to an initial value to.

Following step 53 is step 54, at which it is determined for the next field of video signal whether the first auto-focus measurement value ESTa has changed. If not, again the routine returns to step 51. Otherwise, step 55 follows step 54. At step 55 it is determined whether the second auto-focus measurement value ESTb has changed. Again, if not, the routine cycles back to the beginning and step 51. However, if both of the values have changed, then step 56 follows, at which the count t is decremented. After step 56 comes step 57, at which it is determined whether the count has been decremented to zero. If not, the routine loops back to step 54. However, if at step 57 the count t is found to have reached 0, then it is recognized that both of the auto-focus measurement values ESTa and ESTb have changed over a period of to fields so that an auto-focus operation (step 58) is performed.

Summarizing the routine of FIG. 15, a determination as to whether to perform an auto-focus operation is made on the basis of two auto-focus measurement values, one of which is provided according to an H line peak hold system and the other being provided on the basis of a V peak hold system. An auto-focus operation is performed when both are found to have changed over a period of t0 fields. Using this procedure, it can be determined with relative reliability whether an auto-focus operation should be performed.

A circuit in which the routine of FIG. 15 is carried out may be similar to the conventional circuit of FIG. 2 except for the following modifications: instead of a single detecting unit 4, two detecting units are provided, connected so as to receive in parallel the signals $S_{1,1}$ - - - $S_{k1,k2}$ output from ABS circuit 3. One of the detecting units generates the first auto-focus measurement value ESTa according to the conventional H line peak hold system and the other detecting unit generates the second auto-focus measurement value ESTb according to the conventional V peak hold system. The measurement values ESTa and ESTb are provided via respective output terminals to a conventional control circuit such as a microprocessor (not shown) suitably programmed to carry out the routine of FIG. 15.

Alternatively at least one of the detecting circuits may generate an auto-focus measurement value according to the embodiments of FIG. 7 or 9.

Considering first the auto-focus measurement value ESTb (V peak hold system), it should be noted that if an object is located at the limit of the range finder frame, and moves in and out of the range finder frame, the value ESTb is subject to fluctuation so that the movement of the object can be misinterpreted as a change of the entire scene. However, such a situation has little effect on the first auto-focus measurement value ESTa, so that it can be correctly determined that the scene has not changed.

On the other hand, with respect to the auto-focus measurement value ESTa (H line peak hold system), movement of an object in the longitudinal direction can cause an erroneous determination that the scene has changed. However, such a moving object does not affect the auto-focus measurement value ESTb, so that again there is a correct determination that the scene has not changed.

Because of the increased reliability provided by using the two different auto-focus measurement values, the determination period of to fields can be made relatively short so that an auto-focus operation can be performed more promptly, but without causing an unstable picture.

Having described preferred embodiments of the invention with reference to the accompanying drawings, it is to be understood that the invention is not limited to those precise embodiments and that various changes and modifications may be effected therein by one skilled in the art without departing from the spirit or scope of the invention as defined in the appended claims.

What is claimed is:

1. An apparatus for generating an auto-focus measurement value to be used in performing an auto-focus operation on the basis of contrast components of a field of a video signal, comprising:

line peak means for sequentially receiving lines within said field of said video signal and generating respective maximum values of contrast components of said received lines within said field of said video signal;

average means for sequentially averaging said maximum values generated by said line peak means over predetermined groups of said lines within said field of said video signal to form a plurality of average values for said field; and peak hold means for outputting as said auto-focus measurement value for said field of said video signal a maximum value of said plurality of average values formed by said average means.

2. An apparatus according to claim 1, wherein each of said groups of lines consists of n lines, where n is an integer that is greater than two.

3. An apparatus according to claim 2, wherein n=5.

4. An apparatus according to claim 2, wherein n=4.

5. An apparatus according to claim 2, wherein none of said groups of n lines overlaps any other of said groups of n lines.

6. An apparatus according to claim 2, wherein each of said groups of n lines overlaps with at least one of said other groups of n lines to the extent of m lines, where m is a positive integer that is less than n.

7. An apparatus according to claim 6, wherein m=n−1.

8. An apparatus according to claim 6, wherein m=n−2.

9. An apparatus for generating an auto-focus measurement value to be used in performing an auto-focus operation on the basis of contrast components of a field of a video signal, comprising:

line peak means for sequentially receiving lines within said field of said video signal and generating respective maximum values of contrast components of said received lines within said field of said video signal;

low-pass filter means for receiving and low-pass filtering said maximum values generated by said line peak means to produce a filtered output signal with respect to said field of said video signal; and peak hold means for outputting as said auto-focus measurement value for said field of said video signal a maximum value of said filtered output signal produced by said low-pass filter means with respect to said field of said video signal.

10. An apparatus for performing an automatic focus operation on the basis of contrast components of a video signal, comprising:

means for detecting maximum values of contrast components of respective lines of said video signal;

means for averaging the detected maximum values corresponding to the lines of said video signal to form a first auto-focus measurement value;

means for detecting a maximum value of contrast components with respect to a field of said video signal and for outputting said detected maximum value for said field as a second auto-focus measurement value; and means for determining, in response to a change in both said first and second auto-focus measurement values, that an auto-focus operation should be performed.

11. An apparatus according to claim 10, further comprising means for replacing a horizontal blanking period of said video signal with a signal having a level that is substantially equal to a starting portion of a line within a range finder frame of said video signal.

12. An apparatus according to claim 11, further comprising means for replacing a vertical blanking period of said video signal with a signal having a level that is substantially equal to a starting portion of a line within a range finder frame of said video signal.

13. An apparatus according to claim 10, wherein said means for averaging includes means for sequentially averaging said detected maximum values of said respective lines over predetermined groups of lines within said field of said video signal to form a plurality of average values and means for selecting a maximum value of said plurality of average values as said first auto-focus measurement value.

* * * * *